United States Patent
Chamberlain et al.

(10) Patent No.: US 6,476,353 B2
(45) Date of Patent: Nov. 5, 2002

(54) LASER SURFACE FINISHING APPARATUS AND METHOD

(75) Inventors: William S. Chamberlain, Rochester, MI (US); David Otto, Lake Orion, MI (US)

(73) Assignee: JS Chamberlain & Assoc., Troy, MI (US)

(*) Notice: Subject to any disclaimer, the term of this patent is extended or adjusted under 35 U.S.C. 154(b) by 0 days.

(21) Appl. No.: 09/759,943

(22) Filed: Jan. 12, 2001

(65) Prior Publication Data

US 2001/0032832 A1 Oct. 25, 2001

Related U.S. Application Data

(60) Provisional application No. 60/178,124, filed on Jan. 26, 2000.

(51) Int. Cl.[7] .................................................. B23K 26/073
(52) U.S. Cl. ........................... 219/121.83; 219/121.73; 219/121.69
(58) Field of Search .................... 219/121.7, 121.71, 219/121.85, 121.62, 121.68, 121.69, 121.72, 121.73, 121.74, 121.75

(56) References Cited

U.S. PATENT DOCUMENTS

| | | | |
|---|---|---|---|
| 3,755,646 A | | 8/1973 | Muller |
| 3,813,511 A | | 5/1974 | Staal |
| 4,122,240 A | * | 10/1978 | Banas et al. |
| 4,588,885 A | | 5/1986 | Lovoi et al. |
| 4,737,628 A | | 4/1988 | Lovoi |
| 4,972,061 A | | 11/1990 | Duley et al. |
| 4,986,664 A | | 1/1991 | Lovoi |
| 5,001,917 A | * | 3/1991 | Berstein |
| 5,059,760 A | | 10/1991 | Iehisa et al. |
| 5,061,839 A | | 10/1991 | Matsuno et al. |
| 5,118,917 A | | 6/1992 | VanKrieken et al. |
| 5,151,134 A | | 9/1992 | Boquillon et al. |
| 5,166,505 A | | 11/1992 | Gorriz et al. |
| 5,373,135 A | | 12/1994 | Beyer et al. |
| 5,376,770 A | | 12/1994 | Kuhl et al. |
| 5,424,508 A | | 6/1995 | Swain et al. |
| 5,463,202 A | | 10/1995 | Kurosawa et al. |
| 5,473,136 A | | 12/1995 | Engelhardt et al. |
| 5,478,426 A | | 12/1995 | Wiler et al. |
| 5,486,677 A | | 1/1996 | Maischner et al. |
| 5,516,998 A | | 5/1996 | Chatelain et al. |
| 5,569,399 A | | 10/1996 | Penney et al. |
| 5,744,776 A | * | 4/1998 | Bauer |
| 5,744,780 A | * | 4/1998 | Chang et al. |
| 5,864,114 A | * | 1/1999 | Fukuda |
| 5,883,356 A | * | 3/1999 | Bauer et al. |
| 6,215,094 B1 | * | 4/2001 | Dausinger et al. |

* cited by examiner

Primary Examiner—M. Alexandra Elve
Assistant Examiner—Jonathan Johnson
(74) Attorney, Agent, or Firm—Young & Basile, PC

(57) ABSTRACT

A method and apparatus for finishing a surface of a vehicle part. A laser surface finishing means includes a finishing laser and at least one surface topography sensor. A first sensor scans each footprint of the surface and measures the footprint height. Each footprint height is compared to a reference height for that footprint area. If the footprint height is above the reference height, the laser generates a beam to either remove or cause reflow of a predetermined amount of material from the high points. These steps are repeated in a predetermined scanning pattern until each footprint height is not above the reference height for that footprint. In one aspect, a second sensor scans each footprint of the surface after the laser operates or not, and the height measured by the second sensor is used to determine if the steps need to be repeated.

11 Claims, 3 Drawing Sheets

LASER SURFACE FINISHING APPARATUS AND METHOD

This application claims priority to provisional application No. 60/178,124 filed Jan. 26, 2000.

BACKGROUND OF THE INVENTION

1. Field of the Invention

The invention relates to finishing the surface of workpiece and, more specifically, to finishing the surface of a workpiece using a laser.

2. Description of the Related Art

In the automotive industry, certain vehicle parts, such as a rear deck air spoiler, are made of plastic. Since these parts are generally exterior parts, surface quality or finish is critical. Even when the part is an interior part, surface finish is important. However, these vehicle parts are formed by a variety of techniques providing various surface qualities, such techniques including blow molding, injection molding, extrusion, etc. Many of these techniques provide a surface requiring labor and sanding to meet surface requirement standards. In particular, for example, a blow molding process produces a part requiring extensive labor and sanding to meet class A surface requirements. This is expensive and increases the part cost.

What is needed is an apparatus and method that is capable of finishing the surface of a vehicle part to meeting class A surface finish requirements while minimizing the need for manual sanding.

SUMMARY OF THE INVENTION

The invention is an apparatus and method for finishing the surface of a vehicle part using a laser. The method of the invention comprises the steps of: measuring a first height of a footprint area of the surface, comparing the first height to a reference height associated with the footprint area; and firing a laser onto the footprint area when the first height is above the reference height. Preferably, the surface includes a plurality of footprint areas, and these steps are performed for each footprint area of the surface in a predetermined pattern. In one aspect of the invention, the steps are performed by dividing the surface into sets of footprint areas, each set including a predetermined number of footprint areas; and repeating the steps for a set of footprint areas until the laser is not fired at any footprint area in the set. Then, the invention proceeds to repeat the steps for the next set of footprint areas until the steps are performed for all the sets.

In another aspect of the invention, the method further comprises the steps of measuring a second height of the footprint area after the firing step and comparing the second height to the reference height associated with the footprint area. All of the steps are completed at least once for each footprint area. In one aspect, the steps are repeated for each footprint area if the step of comparing the second height shows that the second height of each footprint area is above the reference height associated with each footprint area.

The apparatus of the present invention comprises: means for measuring a first height of a footprint area of the surface, means for comparing the first height to a reference height associated with the footprint area; and means for firing a laser onto the footprint area when the first height is above the reference height. In another aspect of the invention, the apparatus further comprises means for measuring a second height of the footprint area after the firing step, and means for comparing the second height to the reference height associated with the footprint area. In one aspect of the invention, the size of the footprints are determined based on the energy density of the laser.

Preferably, the means for measuring the first height is a first surface topography sensor, and the means for measuring the second height is a second surface topography sensor. The reference height for each footprint area is a math data coordinate corresponding to a design data point of the surface.

In one aspect of the invention, the laser is a pulsed laser. In another aspect, the laser is a continuous output laser.

Thus, the invention provides an apparatus and method for finishing the surface of a vehicle part using a laser, which minimizes manual sanding.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENTS

The laser surface finishing apparatus and method of the present invention is designed to improve the surface finish of plastic parts or components to meet automotive exterior appearance and performance requirements. Thus, although the following description of one application of the present apparatus and method is directed toward surface finishing of a rear deck vehicle air spoiler, it will be understood that the present surface finishing apparatus and method may be employed with other components and workpieces.

Figure 1:
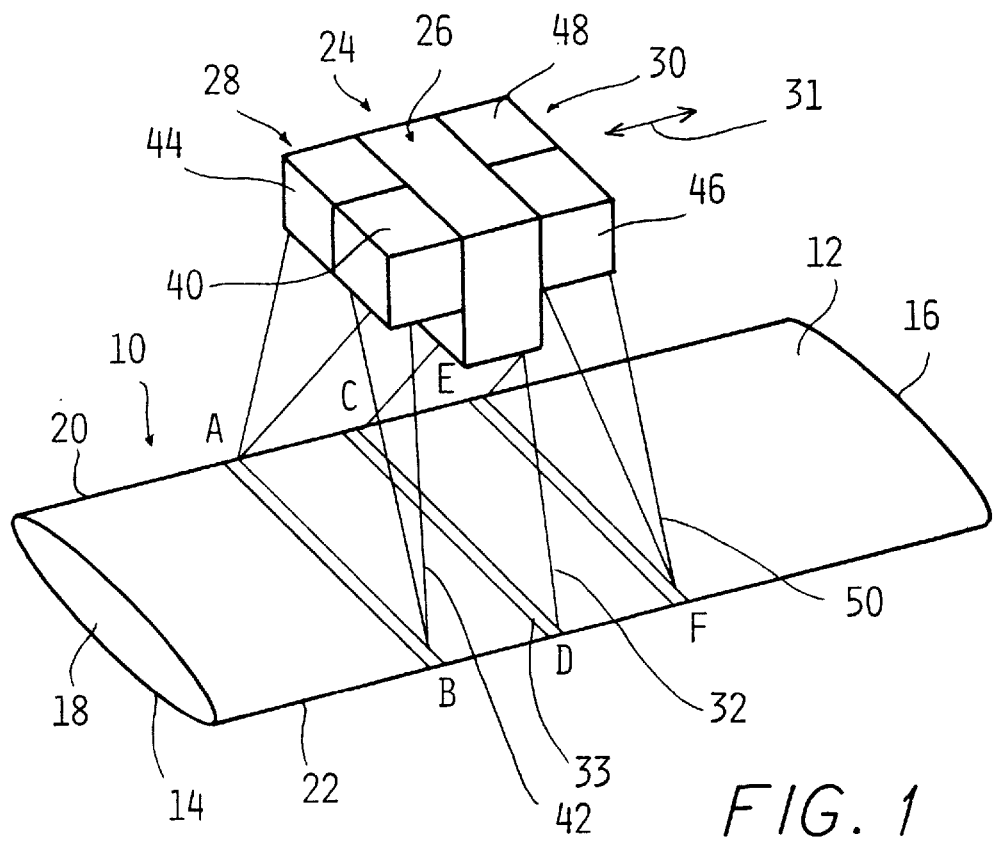
FIG. 1 is a pictorial representation of a surface finishing apparatus and method according to one aspect of the present invention.
Figure 2:
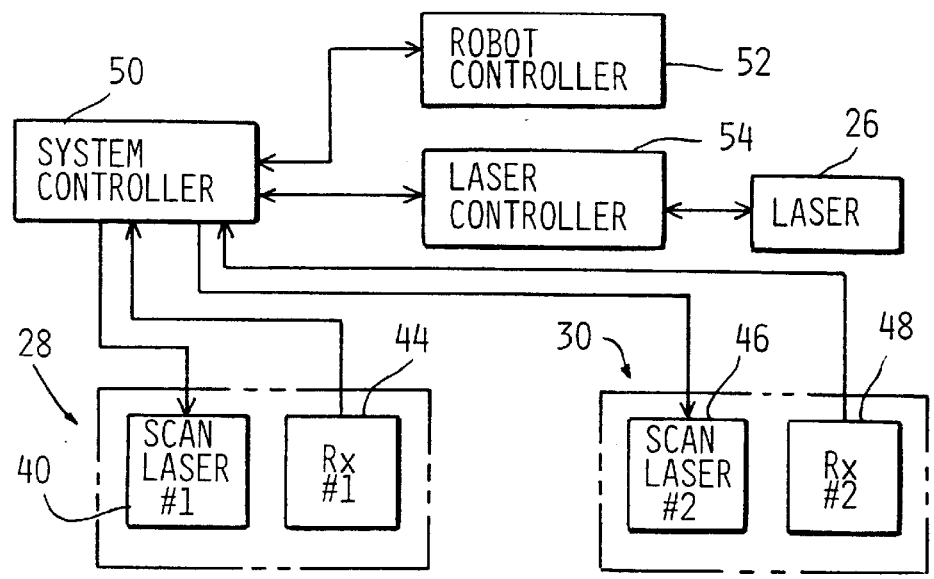
FIG. 2 is a block diagram of the main components of the surface finishing apparatus and method shown in FIG. 1.

Referring now to FIGS. 1 and 2, a laser surface finishing apparatus and method according to one aspect of the present invention will be described.

An exemplary workpiece or part 10 is depicted in a form of a vehicle rear deck air spoiler. The air spoiler 10 has a top surface 12, opposed bottom surface 14, opposed end surfaces 16 and 18 and oppose side edges 20 and 22. It will be understood that the use of the terms top, bottom, side and end is with reference to the normal mounting position of the air spoiler 10 on the rear deck, roof or other suitable vehicle structure.

As is generally known, a vehicle rear deck air spoiler, such as the air spoiler 10 shown in FIG. 1, may take a variety of shapes, some including stanchions, built in lights, etc. However, as a general feature, air spoilers typically have an aerodynamic or air foil shape formed of a smoothly convexly curved upper surface 12 and a inverted convex bottom surface 14. The bottom surface 14, which is typically not readily visible, may also have more of a flat shape as it will typically include the supports or brackets used to mount the air spoiler 10 to the rear deck of a vehicle or will be mounted on the deck lid itself.

In order to further understand the various applications and features of the present apparatus and method, the following description, although directed toward the mounting of the laser surface finishing means 24 on a robot end effector, not shown, and the fixed mounting of the air spoiler 10 in a suitable mounting fixture, also not shown, the fixed and moveable mountings may be reversed such that the laser surface finishing means 24 can be affixedly mounted in a stationary fixture and the air spoiler 10 is mounted on a robot end effector or other moveable tool where in the air spoiler 10 is moved with reference to the fixed laser surface finishing means 24 to bring the entire exterior surface or at least the top surface 12 of the air spoiler 10 past the laser surface finishing means 24.

The math data coordinates of the surface topography of the air spoiler 10, primarily of the top surface 12 and possibly the bottom surface 14, and the exterior coordinates of the ends 16 and 18 and the side edges 20 and 22 will be known from the design data of the spoiler 10.

By way of example only, the air spoiler 10 is formed of a plastic material which is suitably formed to the desired shape as shown in FIG. 1. By way of example only, the air spoiler 10 is formed by a blow molding process in which pressured gas is applied within the interior of a molten plastic flow in a mold cavity to force the molten plastic against the walls of the mold cavity to form the air spoiler 10 to the desired shape with a hollow interior. Due to molding process characteristics surfaces of the air spoiler 10 are typically formed with surface irregularities including high points and low points which must be smoothed out to bring the air spoiler 10 to the desired surface finish requirements of a class A exterior vehicle body part as well as a surface capable of receiving paint.

According to the present apparatus and method, the laser surface finishing means 24 include a finishing laser 26, a first surface topography sensor 28 and optionally, but preferably, a second surface topography sensor 30.

The finishing laser 26 may be any suitable high powered laser capable of generating a beam 32 of radiant energy. For example, the beam 32 may be generated by a $CO_2$ laser which produces radiant energy having a 10.6 micron wave length. Different types of lasers more suitable for the requirements of a particular application may also be used within the scope of the present invention.

The laser 26 may be either a pulsed or continuous output laser. The beam 32 is focused or defocused to provide for a predetermined amount of power at a predetermined distance from the laser 26 sufficient to remove a thickness of material from one surface 12 or 14 of the air spoiler 10. For example, the power output of the laser 26 may be selected such that the beam 32 removes 100–200 micro-inches of material from the top or bottom surfaces 12 or 14 of the air spoiler 10 at a power rating 5 joules per square centimeter, and with a 20 microsecond long laser pulse.

It will also be understood that the laser finishing apparatus and method of the present invention, while capable of removing material on the workpiece, may also create a certain amount of re-flowing of the surface material of the workpiece. Both removal, i.e., vaporization, etc, or re-flowing creates a smooth finish which meets the class A surface requirements of an exterior vehicle panel or part. Thus, it will be understood that the use of the term "remove" as used hereafter, will be understood to include both the removal of an upper thickness or portion of a surface of a workpiece by the laser 26 by removal of a portion of the thickness, vaporization, etc., as well as heating of a portion of the thickness of the workpiece struck by the laser to a sufficient temperature to cause reflow of high points on the surface into adjacent surface portions.

Means are provided for moving the laser 26 over the exterior top surface 12 and/or the bottom surface 14 of the air spoiler 10 in a predetermined pattern, typically in one or more spaced, longitudinal paths between the ends 16 and 18 in the direction of arrow 31 in FIG. 1. The travel path is from one end 16 to the opposite end 18 of each surface 12 and/or 14 of the air spoiler 10.

Regardless of how the path or movement of the laser 26 is implemented, if the energy density and/or pulse length of the laser 26 is varied, more or less pulses may be required to remove a prescribed thickness of the exterior top or bottom surface 12 or 14 to bring the top or bottom surface 12 or 14 into a smooth shape or profile.

It will be understood that the primary intent of the laser surface finishing apparatus and method of the present invention is to form a smooth exterior shape to a molded plastic or composite workpiece or part. At the same time, it may also be possible to bring the surface shape and dimensions of the workpiece into conformance with the specified math data coordinates of the designed workpiece. Thus, it will be understood that the following description of a comparison of each incremental area or footprint on a surface of workpiece with a reference height or dimension, such as the math data coordinates of the workpiece, is to be understood as being only a reference. The function of the present apparatus and method is to provide only a smooth surface which may be achieved without the surface of the workpiece actually meeting the math data coordinates or surface profile specified by the design data for the workpiece. For example, the reference height used for comparison could be the height of the preceding incremental area or footprint, or the reference height could be a constant value.

The amount of material removed at each pass of the laser 26 over a predetermined incremental area 33 of the top or bottom surface 12 or 14 of the air spoiler 10 is determined by the beam footprint size. For given laser output, an energy density will be selected which will determine the size of the footprint or incremental area. The average power of the laser will determine the maximum pulse rate. For example, the beam 32 of the laser 26 could have a footprint or incremental surface area of one square centimeter at an energy density of 5 joules per square centimeter. Alternately, the footprint or incremental surface area covered by the laser beam 32 may have an elongated shape as shown by the footprint 33 in FIG. 1. In this aspect, the output of the laser 26 is defocused so as to provide the laser beam 32, at the point where it impacts on the surface 12 of the spoiler 10 with a wide footprint 33, preferably extending between along the entire length of the line C–D or between the side edges 20 and 22 of the spoiler 10. This enables the laser 26 to remove material from the entire width of the spoiler 10 in one pass when the laser surface finishing apparatus 24 is moved longitudinally in the direction of arrow 31 between the ends 16 and 18 of the spoiler 10. In yet another alternative, the footprint or incremental surface area covered by the laser beam 32 could be such that the entire surface of the spoiler 10 is included in one footprint or surface area. Actual energy density and footprint area may possibly vary for each different application.

It will be understood that other footprints and paths of movement of the laser 26 may also be provided within the scope of the present invention. For example, the laser surface finishing apparatus 24 may move in a plurality of side-by-side, longitudinal paths between the ends 16 and 18 of the spoiler 10. In each path, the footprint 33 of the laser beam 32 will be appropriately shaped. Alternately, the laser surface finishing apparatus 24 may be moved in one path in the direction of arrow 31 between the ends 16 and 18 of the spoiler 10, but with the laser 26 moved sideways to cause the laser beam 32 to impact with the surface 12 of the spoiler 10 over the entire area of the surface 10.

The laser pulse rate and the achieved material removal rate can be determined by the pulse rate of the laser 26 which, by example, may provide 20 microsecond pulses at a maximum pulse rate of about 1,000 Hz. These factors may be varied to prevent excessive heating of the underlying material of the air spoiler 10, as well as to enable smoke generation, residue clearing, etc., to be efficiently handled.

According to the present invention, the laser surface finishing means 24 is provided with at least one surface topography sensor, such as surface topography sensor 28. By way of example only, the surface topography sensor 28 includes a low power laser 40 which outputs a laser beam 42 onto the surface of the air spoiler 10. The beam 42 is disposed at an angle to normal such that the laser beam 42 is reflected off of the top surface 12 of the air spoiler 10 in the example as shown in FIG. 1 to a receiver 44. The time period between the generation of the laser beam 42 and the reception of the reflected laser beam 42 by the receiver 44 may be used to calculate the height of a particular footprint or incremental surface area, on the top surface 12 of the air spoiler 10 with respect to adjacent incremental areas. This provides an indication of surface topography of each footprint area or portion of the exterior surfaces of the air spoiler 10.

The purpose of the laser 40 is to measure the surface profile along one incremental part of the surface 12 of the spoiler 10, such as along the line A–B shown in FIG. 1 with respect to a reference or datum. The output of the laser 40 may be defocused, in the same manner as the output of the laser 26 described above, to cause the laser 42 to scan the entire width of the line A–B, or a larger area. Alternately, the output beam 42 of the laser 40 may be a small footprint, such as one square centimeter, but directed in a series of incremental points to form a continuous scan line between points A–B.

The height or profile is output from the first receiver 44 of the first sensor 28 to a system controller, shown in FIG. 2. The system controller 50, which may be any suitable controller, such as microprocessor based controller operating a memory stored, control program, interacts with a robot controller 52 which controls the movement of the robot end effector carrying the laser surface finishing means 24 and a laser controller 54 which controls the firing of the laser 26. The system controller 50 is capable of storing the measured dimensions for use in controlling the laser 26. In this manner, depending upon the particular dimension measured by the sensor 28, the system controller 50 will provide a suitable output signal to the laser controller 54 to keep the laser 26 off for a particular surface footprint if the surface dimension or profile of the particular footprint smoothly matches the surface profile of adjacent footprints. Alternately, the system controller 50 can provide an output signal to the laser controller 54 to cause the laser controller 54 to generate pulses to the laser 26 to pulse the output of the laser 26 onto a particular footprint to remove material therefrom.

Typically, the surface profile of an incremental area, such as an incremental area along line C–D in FIG. 1, will have surface irregularities where some incremental points are higher than adjacent points, with the height of the points varying randomly across line C–D from a datum. The laser beam 32 will typically cause greater heating of the higher points than of the adjacent lower points. In this manner, the higher points will be vaporized, removed or caused to reflow into the adjacent points forming a smooth surface finish or profile along line C–D.

The surface topography sensor 28 and the laser 26 move together via the robot end effector across the entire surface 12 or 14 of the air spoiler 10 as well as any other surfaces, such as mounting brackets, the side edges 20 and 22 and the ends 16 and 18 which require the desired smooth finish.

A second surface topography sensor 30, which also includes a low power laser 46 and a receiver 48, may also be provided for quality or inspection purposes. A laser beam 50 from the laser 46 is reflected off of the surface of the air spoiler 10 to the receiver 48 to determine the surface topography or profile of a particular footprint area on the surface of the air spoiler 10. The beam 50 from the laser 46 is typically moved in a scanning pattern along line E–F in FIG. 1 to scan the entire width of the line E–F as the laser surface finishing means 24 moves in one longitudinal path in the direction of arrow 31 over the spoiler 10.

As shown in FIG. 1, the second surface topography sensor 30 is mounted rearward of the laser 26 in the direction of travel 31 of the laser 26 across the surface 12 of the air spoiler 10. This enables the second sensor 30 to be used to measure the profile of the last footprint scanned by the laser 26 during each scan of a particular footprint on the surface of the air spoiler 10. The first and second sensors 28 and 30 thus co-act with the laser 26 with the first sensor 28 measuring the surface topography of a particular footprint on the surface of the air spoiler 10 prior to removal or reflowing of material by the laser 26, if necessary, and the second sensor 30 checks the footprint scanner by the laser 26 to determine if the surface topography of a particular footprint area on the surface of the air spoiler 10 has a smooth surface finish profile.

Figure 3:
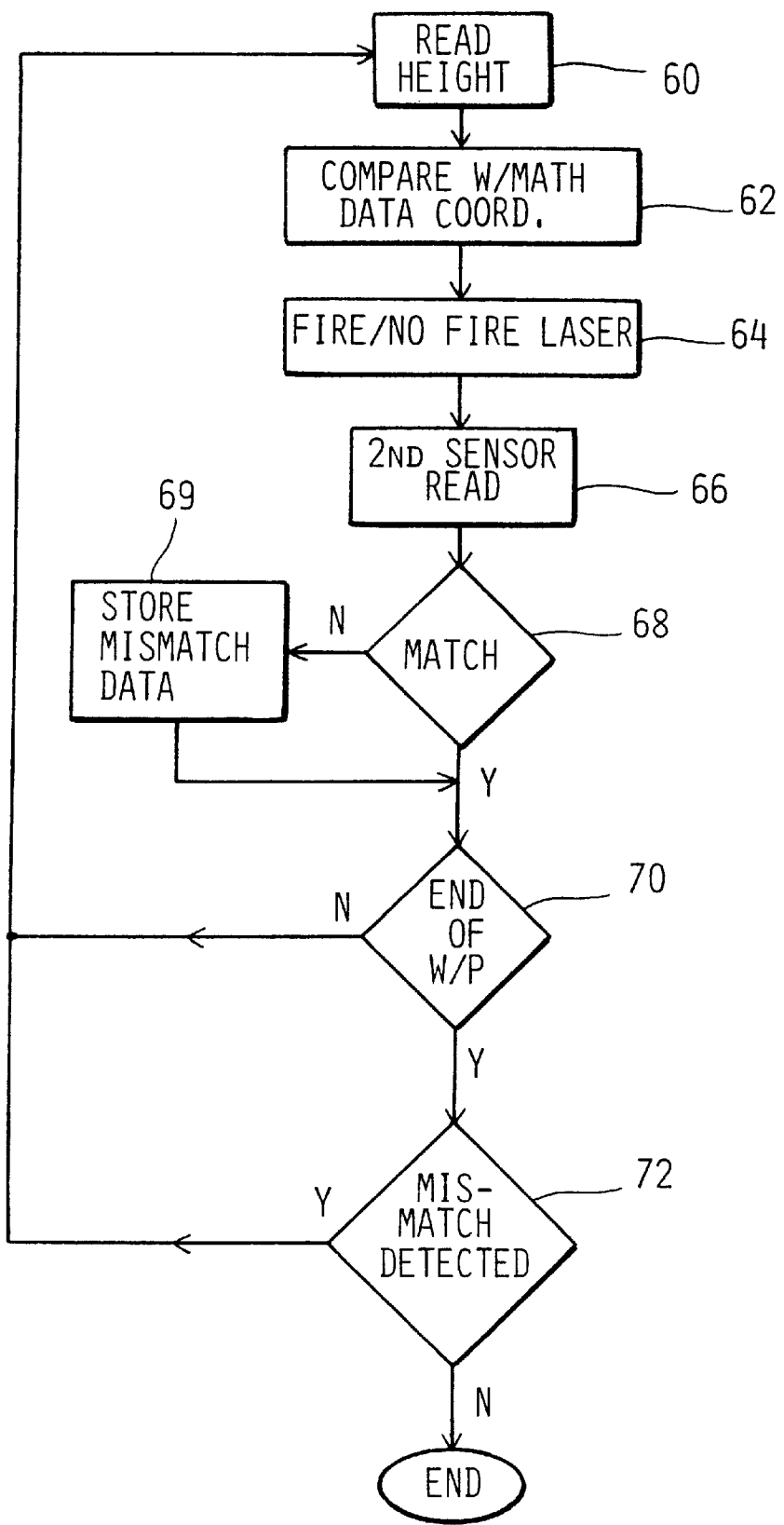
FIG. 3 is a control diagram depicting the sequence of steps of the surface finishing method according to one aspect of the invention shown in FIG. 1.

This sequence is more clearly shown in FIG. 3, which depicts a control sequence implemented by the system controller 50 when executing the stored control program. At each footprint or incremental area on one surface of the air spoiler 10, the first sensor 28, in step 60, reads the height of the surface of the footprint being scanned with respect to a reference profile. The height measurement is input to the system controller 50 which compares the height measurement in step 62 with the reference height of the particular footprint area. The system controller 50 then generates an output signal to the laser controller 54 to control the firing or non-firing of the laser 26 onto the particular footprint area in step 64.

Simultaneously, the second sensor 30 is reading the height or profile of each incremented footprint or incremental area along line E–F in step 66. If the profile matches the present math data coordinates or depicts a smooth profile in step 68, the system controller 50 determines if the laser surface finishing apparatus 24 is at the end of the workpiece in step 70.

Referring back to step 68, if the surface profile measured by the second sensor in step 66 does not match the reference datum, the system controller 50 will store the mismatched coordinates in step 69 and then advance to step 70 as described above. If the end of the workpiece is reached, the system controller 50 determines in step 72 if a mismatch was detected during the preceding scan. If not, the control program ends. If a mismatch was detected, the system controller 50 advances back to the start of the scan program and moves the laser surface finishing apparatus back to the start position on the workpiece or spoiler 10 to repeat the entire scanning and the laser generated removal or reflow process described above until all of the surface portions of the workpiece or spoiler 10 have a smooth profile with adjacent surface portions.

This process is continued over the surface(s) 12 and 14 of the air spoiler 10 as well as optionally over the side edges 20 and 22 and the ends 16 and 18. Obviously, moving the laser 26 over the side edges 20 and 22 and the ends 16 and 18 requires repositioning of the laser surface finishing means 24 on the robot end effector, or, in a stationery laser surface finishing means 24, of the moveable fixture carrying the air spoiler 10. However, such movement may be a smooth continuous movement of the laser 26 over the surface of the air spoiler 10 or a sequence of on and off movements enabling the laser 26 and the air spoiler 10 to be repositioned as necessary so that the laser 26 is capable of removing material as required from the entire surface of the air spoiler 10.

Figure 4:
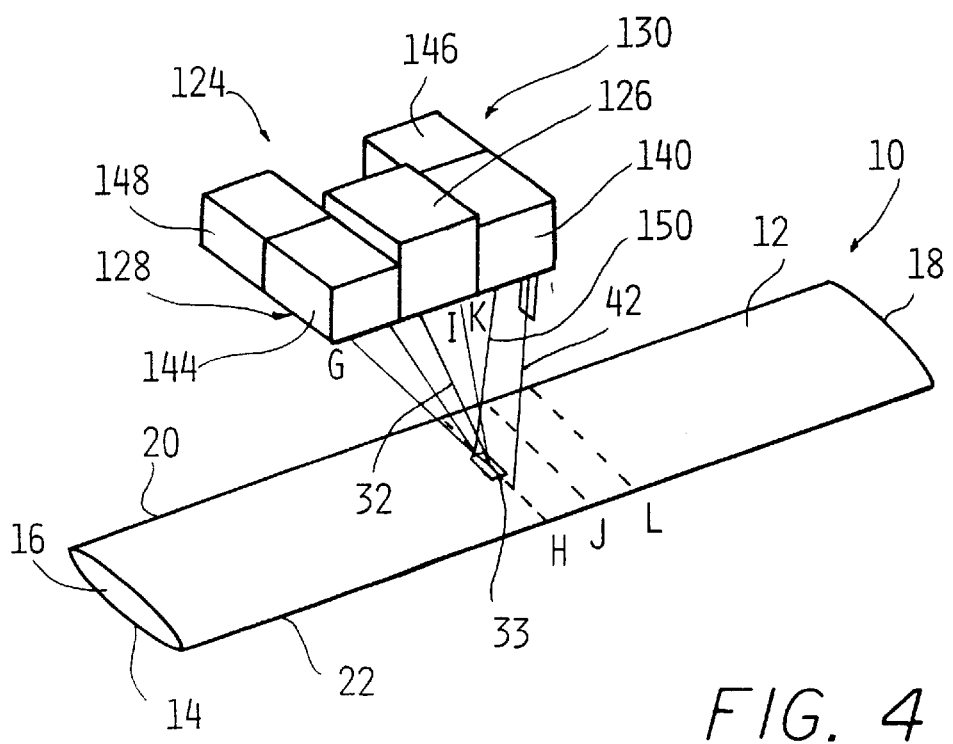
FIG. 4 is a pictorial representation of a surface finishing apparatus and method according to another aspect of the present invention.
Figure 5:
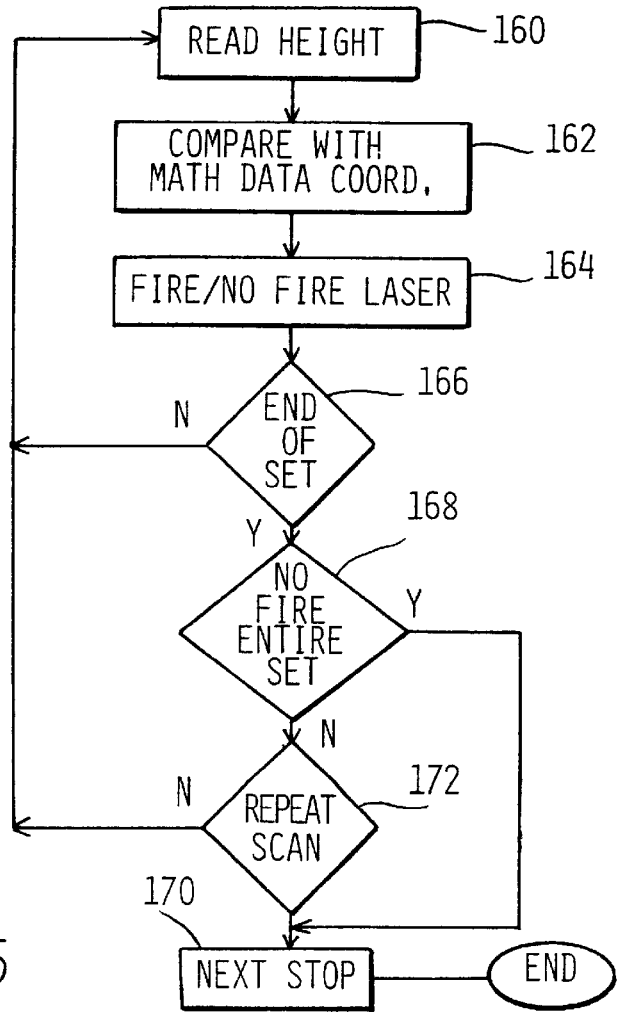
FIG. 5 is a control diagram depicting the sequence of steps of the surface finishing method according to one aspect of the invention shown in FIG. 4.

Turning now to FIGS. 4 and 5, there is depicted another aspect of the present laser surface finishing apparatus and method. As this aspect shares many common features with the first aspect described above, the components in this aspect are designated with a 100 prefix, such as 126, 144, etc., to provide continuity between the two aspects of the present invention.

In this aspect of the invention, a laser surface finishing apparatus 124 is designed to form a smooth exterior surface and/or an exterior surface that meets the reference profile of a particular workpiece or part, such as the spoiler 10 in the same manner as described above for the laser surface finishing apparatus 24. However, the path of movement and the operation of the laser surface finishing apparatus 124 is slightly different from the first aspect described above.

According to this aspect of the present apparatus and method, the laser surface finishing means 124 include a finishing laser 126, a first surface topography sensor 128 and optionally, but preferably, a second surface topography sensor 130.

The finishing laser 126 may be any suitable high powered laser capable of generating a beam 132 of radiant energy. For example, the beam 132 may be generated by a $CO_2$ laser which produces radiant energy having a 10.6 micron wavelength. Different types of lasers more suitable for the requirements of a particular application may also be used within the scope of the present invention.

The laser 126 may be either a pulsed or continuous output laser. The beam 132 is focused to provide for a predetermined amount of power at a predetermined distance from the laser 126 sufficient to remove material from the top surface 12 of the air spoiler 10. For example, the power output of the laser 126 may be selected such that the beam 132 removes 100–200 micro-inches of material from the top or bottom surface 12 or 14 of the air spoiler 10 at a power rating 5 joules per square centimeter, and with a 20 microsecond long laser pulse.

Means are provided for moving the laser 126 over the exterior surfaces 12 and 14 of the air spoiler 10 in a predetermined pattern, typically in a plurality of closely spaced, generally parallel lines G–H, I–J and K–L as shown in FIG. 4. The travel path over the parallel lines is from one end 16 to the opposite end 18 of each top and bottom surfaces 12 and 14 of the air spoiler 10. Alternately, the laser 126 and the air spoiler 10 may be moved relative to each other to move the laser beam 132 along a longitudinal path extending between the ends 16 and 18 of the air spoiler 10 instead of between the side edges 20 and 22.

Regardless of how the path or movement of the laser 126 is implemented, if the energy density and/or pulse length of the laser 126 is varied, more pulses may be required to vaporize or remove a prescribed thickness of the exterior top or bottom surface 12 or 14 to bring the top or bottom surface 12 or 14 into a smooth surface profile.

The amount of material removed at each pass of the laser 126 over a predetermined incremental area 133 of the top or bottom surface 12 or 14 of the air spoiler 10 is determined by the beam footprint size. For given laser output, an energy density will be selected which will determine the size of the footprint or incremental area. The average power of the laser will determine the maximum pulse rate.

For example, the beam 132 of the laser 126 will be assumed to have a footprint or incremental surface area of one square centimeter at an energy density of 5 joules per square centimeter. Actual energy density and footprint area may possibly vary for each different application.

The laser pulse rate and the achieved material removal rate is determined by the pulse rate of the laser 126 which, by example, may provide 20 microsecond pulses at a maximum pulse rate of about 1,000 Hz. These factors are varied to prevent heating of the underlying material of the air spoiler 10, as well as to enable smoke generation, residue clearing, etc., to be efficiently handled.

Although a continuous one path movement of the laser 126 with respect to the air spoiler 10 may be effected according to the present invention, depending upon energy density and the amount of material to be removed in each pass, and in order to prevent excessive heating of the underlying material of the air spoiler 10 that may adversely change the characteristics of the material, the robot end effector may be programed to move the laser surface finishing means 124 in a path, such as a long line I–J in FIG. 4 for a predetermined distance, such as five centimeters and then retracting and repeating movement of the laser 126 over the same five centimeters of surface area. During each pass, laser 126 is capable of removing a predetermined amount of material. Such a process, while slowing the overall process cycle time, nevertheless enables lower energy densities to be used to minimize excessive heating of the underlying material of the air spoiler 10. This repeating path of movement of laser 126 also has another advantage in conjunction with a surface topography sensor 128 or 130 as described next.

According to the present invention, the laser surface finishing means 124 is provided with at least one surface topography sensor, such as surface topography sensor 128. By way of example only, the surface topography sensor 128 includes a low power laser 140, which outputs a laser beam 142 onto the surface of the air spoiler 10. The beam 142 is disposed at an angle to normal such that the laser beam 142 is reflected off of the top surface 12 of the air spoiler 10 to a receiver 144. The time period between the generation of the laser beam 142 and the reception of the reflected laser beam 142 by the receiver 144 may be used to calculate the height of a particular footprint or incremental surface area, on the top surface 12 of the air spoiler 10 with respect to a reference or datum. This provides an indication of surface topography of each footprint area or portion of the exterior surfaces of the air spoiler 10.

The height dimension is output from the first receiver 144 of the first sensor 128 to a system controller 50, shown in FIG. 2. The system controller 50 operates in the same manner in this aspect of the invention as in the prior aspect. Thus, a repeat of the detailed description of the system controller 50 will not be repeated.

The surface topography sensor 128 and the laser 126 move together via the robot end effector across the entire top and bottom surfaces 12 and 14 of the air spoiler 10 as well as any other surfaces, such as mounting brackets, the side edges 20 and 22 and the ends 16 and 18.

In the case where the laser surface finishing means 124 includes only a single surface topography sensor 128, the system controller 50 will direct signals to the robot controller 52 causing the robot controller 52 to move the end effector carrying the laser 26 in a back and forth motion, as described above, to bring the laser beam 32 over a particular footprint on the surface of the air spoiler 10 at least two times so as to enable sufficient material to be removed to bring the surface topography of the particular footprint to the reference datum of the particular footprint area. On a second or third scan past the same footprint area, the sensor 128 will be able to check the height of the area after material has been removed from the particular footprint in a preceding scan. In this manner, the system controller 50 can generate signals from the robot controller 52 causing additional scans of the same footprint areas on the surface 12 until the surface coordinates of all of the scanned consecutive footprints have a smooth profile.

A more straight forward approach makes use of a second surface topography sensor 130 which also includes a low power laser 146 and a receiver 148 for quality or inspection purposes. A laser beam 150 from the laser 146 is reflected off of the surface of the air spoiler 10 to the receiver 148 to determine the surface topography or height dimension of a particular footprint area on the surface of the air spoiler 10.

As shown in FIG. 4, the second surface topography sensor 130 is mounted rearward of the laser 126 in the direction of travel or advance of the laser 126 across the surface of the air spoiler 10. This enables the second sensor 130 to measure the height of the footprint just scanned by the laser 126. The first and second sensors 128 and 130 thus co-act with the laser 126 such that the first sensor 128 measures the surface topography of a particular footprint on the surface of the air spoiler 10 prior to any removal of high points on the surface by the laser 126 if necessary and the second sensor 130 checks the footprint just scanned by the laser 126 to determine if additional scans of the same footprint are needed to bring the surface topography of the particular footprint area on the surface of the air spoiler 10 into a smooth profile with adjacent surface portions.

The sequence wherein the laser surface finishing means 124 includes only a single surface topography sensor 128 is more clearly shown in FIG. 5, which depicts a control sequence implemented by the system controller 130 when executing the stored control program. At each footprint or incremental area on one surface of the air spoiler 10, the first sensor 128, in step 160, reads the height of the surface of the footprint being scanned. This measurement is input to the system controller 50 which compares the measurement in step 162 with the reference dimension of the particular footprint area. The system controller 50 then generates an output signal to the laser controller 54 to control the firing or non-firing of the laser 126 onto the particular footprint area in step 164.

In the case of a repetitive scan of a number of consecutive footprint areas, such as five footprint areas, the system controller 50 in step 166 determines if the number of footprint areas in each scan, such as five by example only, has been reached. If not, the system controller 50 continues to read the height in step 160 of the next footprint area in one set of footprint areas. However, when the end of the set of footprint areas is reached in step 166, the system controller 50 in step 168 determines if the laser 126 was fired on any of the footprint areas in the current set. If the laser 126 was not fired, the system controller 50 supplies signals to the robot controller 52 in step 170 at the end of each travel path to advance the laser surface finishing means 124 to the next set of footprint areas on the surface of the air spoiler 10. However, if the laser 126 was fired on at least one of the footprint areas in the current set, the system controller 50 in step 172, generates a command to the robot controller 150 to retract the laser surface finishing means 124 to the beginning of the current footprint set to repeat the scan of the set of footprint areas until the laser 126 has not been fired for the entire scan thereby indicating that all of the footprint areas in a particular set define a smooth finish.

This process is continued over the entire top and bottom surfaces 12 and 14 of the air spoiler 10 as well as optionally over the side edges 20 and 22 and the ends 16 and 18.

What is claimed is:

1. A method of finishing a surface of a vehicle part, comprising the steps of:

(A) measuring a first height of one footprint area of the surface;

(B) comparing the first height to a reference height associated with the one footprint area; and (C) firing a laser onto the one footprint area when the first height is above the reference height to remove surface material to reduce the first height to the reference height.

2. The method according to claim 1, wherein the surface includes a plurality of footprint areas and the one footprint area is one of the plurality of footprint areas, the method further comprising the step of performing steps (A), (B) and (C) for each footprint area of the plurality of footprint areas in a predetermined pattern.

3. The method according to claim 2, wherein the performing step further comprises the steps of:

dividing the surface into sets of footprint areas, each set including a predetermined number of footprint areas; and repeating steps (A), (B) and (C) for each set of footprint areas until the laser is not fired at any footprint area in the set.

4. The method according to claim 1, wherein the surface includes a plurality of footprint areas and the one footprint area is one of the plurality of footprint areas, the method further comprising the steps of:

(D) measuring a second height of the one footprint area after the firing step;

(E) comparing the second height to the reference height associated with the one footprint area; and completing steps (A), (B), (C), (D) and (E) at least once for each footprint area of the plurality of footprint areas.

5. The method according to claim 4, further comprising the step of:

repeating steps (A), (B), (C), (D) and (E) for each footprint area if the step of comparing the second height shows that the second height of each footprint area is above the reference height associated with each footprint area.

6. The method according to claim 4, wherein the step of measuring the first height is performed using a first surface topography sensor, and the step of measuring the second height is performed using a second surface topography sensor.

7. The method according to claim 1, wherein the step of measuring the first height is performed using a first surface topography sensor.

8. The method according to claim 1, wherein the firing step comprises the step of firing a pulsed laser.

9. The method according to claim 1, wherein the firing step comprises the step of firing a continuous output laser.

10. The method according to claim 1, wherein the reference height is a math data coordinate corresponding to a design data point of the surface.

11. The method according to claim 1, wherein a size of the one footprint area is determined based on a selected energy density of the laser.

* * * * *